US011210889B2

(12) United States Patent
Fee et al.

(10) Patent No.: US 11,210,889 B2
(45) Date of Patent: Dec. 28, 2021

(54) PURCHASED ITEM MANAGEMENT AND PROMOTIONAL SYSTEM

(71) Applicant: Florence Corporation, Manhattan, KS (US)

(72) Inventors: Kevin A. Fee, Manhattan, KS (US); Penny D. Lasater, Wichita, KS (US)

(73) Assignee: Florence Corporation, Manhattan, KS (US)

( * ) Notice: Subject to any disclaimer, the term of this patent is extended or adjusted under 35 U.S.C. 154(b) by 225 days.

(21) Appl. No.: 16/545,861

(22) Filed: Aug. 20, 2019

(65) Prior Publication Data

US 2020/0066086 A1 Feb. 27, 2020

Related U.S. Application Data

(60) Provisional application No. 62/720,369, filed on Aug. 21, 2018.

(51) Int. Cl.
*G07F 17/12* (2006.01)
*G06Q 30/06* (2012.01)
(Continued)

(52) U.S. Cl.
CPC ......... *G07F 17/12* (2013.01); *G06Q 30/0639* (2013.01); *G07C 9/00896* (2013.01); *G07C 9/00944* (2013.01); *G07C 9/21* (2020.01)

(58) Field of Classification Search
CPC ........ G07F 17/12; G07C 9/21; G06Q 30/0639
See application file for complete search history.

(56) References Cited

U.S. PATENT DOCUMENTS

| 5,385,265 A | 1/1995 | Schlamp |
| 6,456,981 B1 | 9/2002 | Dejaeger et al. |

(Continued)

FOREIGN PATENT DOCUMENTS

| WO | WO 2017/163018 | 9/2017 |
| WO | WO 2017/163018 A2 | 9/2017 |

OTHER PUBLICATIONS

Korean Intellectual Property Office; International Search Report in International Patent Application No. PCT/US2019/047270; dated Jan. 20, 2020; 9 pgs.

(Continued)

*Primary Examiner* — Nabil H Syed

(74) *Attorney, Agent, or Firm* — Leydig, Voit & Mayer, Ltd.

(57) ABSTRACT

Systems, methods and software are provided for providing visual marketing content with a locker system to customers in a retail store environment. The locker system includes an array of lockers, each locker of the array including a door having a flat exterior facing surface. All flat exterior facing surfaces of all lockers of the array are co-planar in their closed positions. The locker system includes a locker central control unit in communication with one or more memory devices. The system includes one or more electronic devices in communication with the locker central control unit for displaying the visual marketing content on one or more of the flat exterior surfaces. In practice, the disclosed systems, methods and software advantageously provide operators the ability to identify customers proximal the locker system, and deliver the visual marketing content in both a generic fashion and in a manner targeted to identified customers.

14 Claims, 9 Drawing Sheets

(51) Int. Cl.
  *G07C 9/00* (2020.01)
  *G07C 9/21* (2020.01)

(56) References Cited

U.S. PATENT DOCUMENTS

| | | | |
|---|---|---|---|
| 7,099,038 B2 | 8/2006 | Schuller | |
| 8,589,310 B2 | 11/2013 | Mayer et al. | |
| 9,082,247 B2 | 7/2015 | Turner et al. | |
| 9,223,315 B2 | 12/2015 | Irwin et al. | |
| 9,547,962 B2 | 1/2017 | Motoyama | |
| 9,604,258 B2 | 3/2017 | Layne et al. | |
| 9,604,259 B2 | 3/2017 | Lossov et al. | |
| 9,715,780 B2 | 7/2017 | Garrison | |
| D864,515 S | 10/2019 | Hirvesaar | |
| D881,503 S | 4/2020 | Hirvesaar | |
| 10,621,811 B2 | 4/2020 | Tovey et al. | |
| 2002/0035515 A1 | 3/2002 | Moreno | |
| 2002/0054370 A1 | 5/2002 | Hara | |
| 2002/0080030 A1* | 6/2002 | Inomata | G07F 17/12 340/542 |
| 2002/0130172 A1 | 9/2002 | Hara | |
| 2002/0177922 A1 | 11/2002 | Bloom | |
| 2003/0025590 A1 | 2/2003 | Gokcebay et al. | |
| 2003/0195696 A1 | 10/2003 | Jones | |
| 2007/0296579 A1 | 12/2007 | Mayer et al. | |
| 2008/0082257 A1 | 4/2008 | Lee | |
| 2009/0204479 A1* | 8/2009 | Wolinsky | H04N 21/25841 705/14.57 |
| 2010/0057580 A1 | 3/2010 | Raghunathan | |
| 2010/0197293 A1 | 8/2010 | Shem-Tov | |
| 2010/0203831 A1 | 8/2010 | Muth | |
| 2011/0125664 A1 | 5/2011 | Kadaba | |
| 2011/0144798 A1 | 6/2011 | Freudelsperger | |
| 2012/0130916 A1 | 5/2012 | Neal et al. | |
| 2012/0194043 A1 | 8/2012 | Turner et al. | |
| 2012/0306617 A1 | 12/2012 | Tung | |
| 2013/0144428 A1 | 6/2013 | Irwin et al. | |
| 2013/0159194 A1 | 6/2013 | Habib | |
| 2013/0198101 A1 | 8/2013 | Beckerle et al. | |
| 2013/0261792 A1 | 10/2013 | Gupta et al. | |
| 2013/0286046 A1 | 10/2013 | Rodriguez | |
| 2013/0307382 A1 | 11/2013 | Garrison | |
| 2013/0337890 A1 | 12/2013 | Earley et al. | |
| 2013/0338822 A1 | 12/2013 | Gibson, Jr. et al. | |
| 2014/0114875 A1 | 4/2014 | Murthy et al. | |
| 2014/0120901 A1 | 5/2014 | Ward et al. | |
| 2014/0279666 A1 | 9/2014 | Lievens et al. | |
| 2014/0316916 A1 | 10/2014 | Hay | |
| 2014/0330603 A1 | 11/2014 | Corder et al. | |
| 2014/0373184 A1 | 12/2014 | Mahaffey et al. | |
| 2015/0081583 A1 | 3/2015 | Butler et al. | |
| 2015/0091693 A1 | 4/2015 | Bibeau et al. | |
| 2015/0106291 A1 | 4/2015 | Robinson et al. | |
| 2015/0120601 A1 | 4/2015 | Fee | |
| 2015/0133051 A1 | 5/2015 | Jamal-Syed et al. | |
| 2015/0186840 A1 | 7/2015 | Torres et al. | |
| 2015/0356801 A1 | 12/2015 | Nitu et al. | |
| 2018/0033235 A1 | 2/2018 | Dotterweich et al. | |
| 2018/0182189 A1 | 6/2018 | Lakshmi-Ratan et al. | |
| 2019/0114585 A1 | 4/2019 | Fee et al. | |
| 2019/0114859 A1 | 4/2019 | Fee et al. | |
| 2019/0370744 A1 | 12/2019 | Fee et al. | |

OTHER PUBLICATIONS

Korean Intellectual Property Office; International Written Opinion in International Patent Application No. PCT/US2019/047270; dated Jan. 20, 2020; 7 pgs.

* cited by examiner

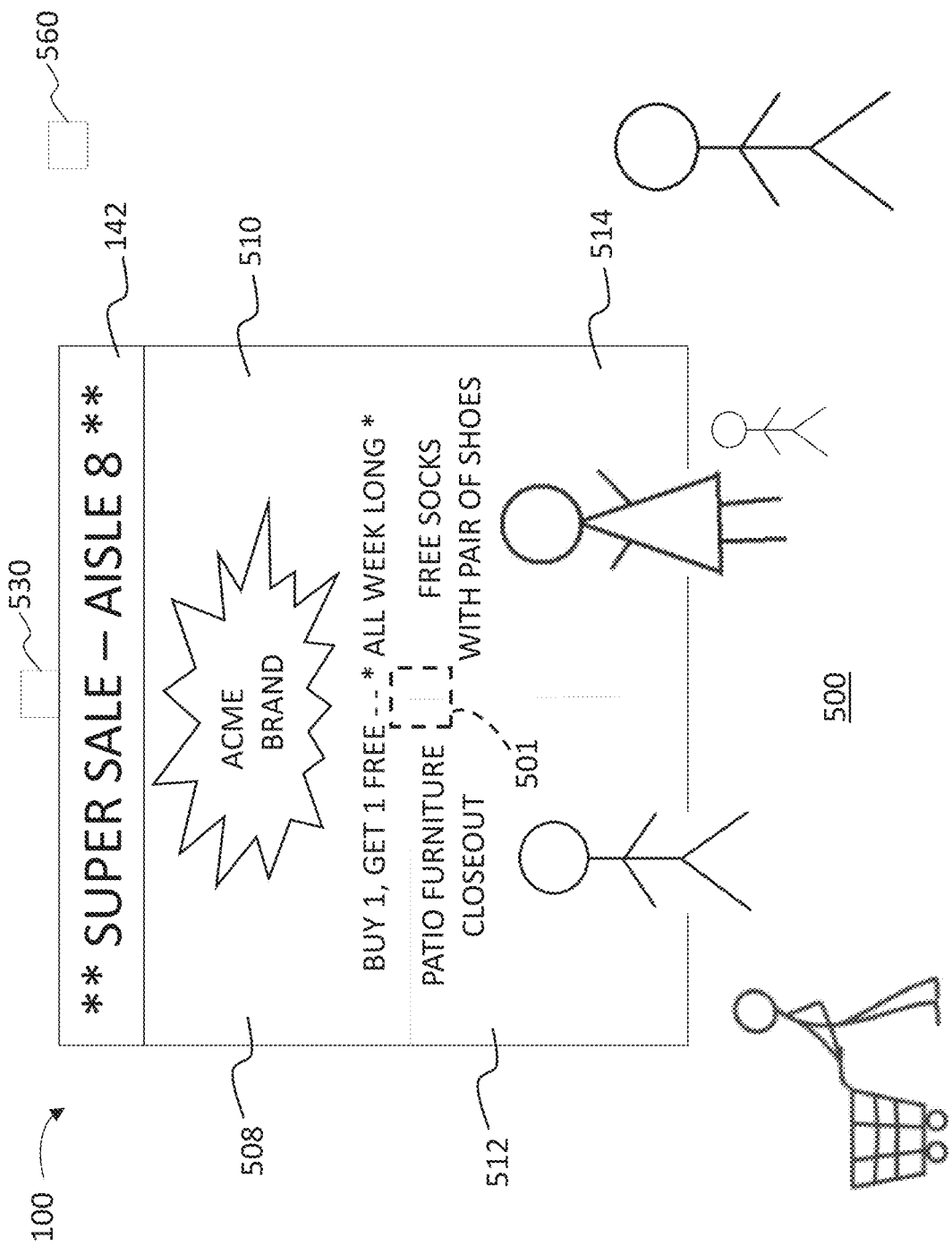

PURCHASED ITEM MANAGEMENT AND PROMOTIONAL SYSTEM

CROSS-REFERENCE TO RELATED APPLICATIONS

This application claims the benefit of, and priority to, U.S. Provisional Patent Application No. 62/720,369 (filed Aug. 21, 2018), which is incorporated by reference herein in its entirety.

TECHNICAL FIELD

The present disclosure relates to a system for managing purchased items, packages and other items that also engage in promotional activities.

BACKGROUND

More and more consumers are embracing online shopping and are spending increasing amounts with online retailers. Some online retailers have used increasing economies of scale to help reduce the costs of shipping purchases to the consumer. Other online retailers have optimized their logistics to reduce the time between an order being placed by a consumer and the delivery of the order to the consumer. Traditional brick-and-mortar retailers have also embraced this shift in consumer demand and introduced online storefronts, along with incentives encouraging consumers to make purchases online.

Consumers now have a wide variety of options for buying goods ranging from shopping fully online to perusing and buying in a brick and mortar retail store, with many alternatives in between. For example, a ship-to-store business model allows a consumer to look for items online, for example on a retailer's website and then pick them up at a local retail store. Payment can be made online so the consumer does not have to wait in line at a checkout counter at the store, but can quickly and easily pick up their order near the front door of the store. To date, most retailers employing this business model have relied on store personnel to either pick the items from the store inventory or tag them when delivered to the store with other inventory from a warehouse. In either case, the ordered and paid for items are held at the service counter to be picked up by the consumer. During periods of high volume, the consumer may not actually save any time waiting for in the service counter line rather than the checkout line. Accordingly, some brick-and-mortar retailers are providing locker systems at or near their storefronts to allow consumers to pick up purchases for which they have paid for on line so as not to wait in lines or require assistance by store employees. However, since these lockers take up valuable retail space, especially if they are located in high traffic areas such as the front of the store; it is desirable that the lockers, including the front face or wall of the array of lockers, be used to the retailer's optimal advantage.

In addition, strictly on-line retailers and shippers have initially developed solutions that allow for a shipper to securely deposit a package or other item for a purchaser in an array of lockers at a convenient, popular location near the purchaser's residence. The resident can then, at a later time, retrieve the package using an identifier. Such a solution helps reduce the time spent by the shipper in trying to deliver packages to individual residential location and reduces losses for the shipper. For example, if the recipient of a package is not home when the shipper arrives at an individual residence, the shipper either leaves the package at the front door where it is subject to possible theft, or takes it back to the truck and either attempts to deliver at a later date or instructs the recipient to pick up the package at a central, easily accessible location. In the latter case, it would be desirable for the consumer to pick up the package at a locker with an authorization code rather than at a warehouse. With the increase in use of this method of shopping and package delivery, the array of lockers at any one location can be quite large, and it is desirable that at least a portion of the front face of the locker array or a header above the array be used for educational or promotional activity.

As e-commerce continues to grow, more and more consumers are choosing to do their shopping online. Buy online, pick-up in store (BOPIS) provides the convenience of shopping from a home or an office, combined with shipping and delivery. Retailers desiring to provide such e-commerce services to customers instead of, or in addition to, traditional brick-and-mortar stores, face problems such as those described above to efficiently satisfy customer demand in these evolving market spaces.

The systems described herein helps address these and other problems and provide a locker system that not only efficiently provides for easy delivery of items to purchasers, but allows for efficient and beneficial use of the front face or wall space inherent in the lockers.

SUMMARY OF THE DISCLOSURE

The invention provides a system for delivering purchased items to a consumer within a retail store having store employees and an electronic store management system including an array of lockers with each locker having a door, and each of the doors having a flat front surface with all front surfaces being co-planar. A locking portion associated with each of the doors is adapted to allow the door to open when in the unlocked state and remain closed when in the locked state. A locker central control unit configured to control the locking portions on the array of lockers includes a data input portion for receiving information from the order management system on a select customer and command a select locking portion to change to the unlocked state to allow the door to open and the purchased item be placed in the locker by a store employee. At least one of the door front surfaces having an electronic display adapted to display a message to shoppers in the retail store.

A first aspect of the disclosure provides a system for delivering purchased items to a select customer within a retail store environment having an order management system, the system including: a) an array of lockers with each locker having a door, and each of the doors having a flat front surface with all front surfaces being co-planar; b) a locking portion associated with each of the doors adapted to allow the door to open when in the unlocked state and remain closed when in the locked state; and c) a locker central control unit configured to control the locking portions on the array of lockers and including a data input portion for receiving information from the order management system on the select customer and command a select locking portion to alternately change from a locked to an unlocked state to allow a respective one or more doors to open and one or more items placed in a respective one or more lockers to be retrieved, where at least one of the door front surfaces includes at least one electronic display screen coupled thereto, the at least one electronic display screen adapted to display a message to shoppers in the retail store environment.

In one embodiment of the system according to the first aspect, the system further includes a header positioned above the array of lockers and adapted to display a message to shoppers in the retail store environment.

In another embodiment of the system according to the first aspect as such or according to any previous implementation form of the first aspect, the array of lockers has at least two doors with front surfaces having electronic display screens adapted to display a message, where the messages on the at least two screens are synchronized.

In yet another embodiment of the system according to the first aspect as such or according to any previous implementation form of the first aspect, the messages on the at least two screens and the header are all synchronized.

In still another embodiment of the system according to the first aspect as such or according to any previous implementation form of the first aspect, the select customer is provided an authentication code by the order management system, where, upon presenting the authentication code to the locker control system, the locking portion for the select locker changes state and the door opens.

In another embodiment of the system according to the first aspect as such or according to any previous implementation form of the first aspect, the order management system controls the content of the message on the electronic display screen.

In yet another embodiment of the system according to the first aspect as such or according to any previous implementation form of the first aspect, responsive to the select customer presenting an authentication code to the locker control system, the order management system provides a message of pre-determined content to the electronic display screen.

In still another embodiment of the system according to the first aspect as such or according to any previous implementation form of the first aspect, the message of pre-determined content is associated with an attribute of the select customer.

In another embodiment of the system according to the first aspect as such or according to any previous implementation form of the first aspect, the message of pre-determined content is associated with an attribute of the product purchased.

In yet another embodiment of the system according to the first aspect as such or according to any previous implementation form of the first aspect, the attribute of the product purchased is the store department in which the product is located.

In still another embodiment of the system according to the first aspect as such or according to any previous implementation form of the first aspect, the electronic display on the select locker displays a message to the select customer.

In another embodiment of the system according to the first aspect as such or according to any previous implementation form of the first aspect, the system further includes a transceiver in communication with the locker central control unit and configured to receive a signal from a mobile computing device running an application associated with the retail store, where the locker central control unit is further configured to: decode the signal received from the mobile computing device; and cause the decoded signal to be processed to determine an identity of a user of the application.

In yet another embodiment of the system according to the first aspect as such or according to any previous implementation form of the first aspect, the locker central control unit is further configured to: responsive to the determined identity of the user of the application, cause one or more messages selected from a set of a plurality of messages to be displayed on the at least one electronic display screen.

In still another embodiment of the system according to the first aspect as such or according to any previous implementation form of the first aspect, to cause the decoded signal to be processed to determine the identity of the user of the application, the locker central control unit is further configured to: transmit, using the transceiver, the decoded signal to the order management system; and receive, via the transceiver, data representative of the identity of the user of the application from the order management system.

In another embodiment of the system according to the first aspect as such or according to any previous implementation form of the first aspect, to cause the one or messages to be displayed on the at least one electronic display device, the locker central control unit is further configured to: receive, via the transceiver, the one or more messages from the order management system; and cause the one or more messages received from the order management system to be displayed on the at least one electronic display screen.

In yet another embodiment of the system according to the first aspect as such or according to any previous implementation form of the first aspect, the system further includes at least one imaging device in communication with the locker central control unit, the at least one imaging device configured to generate image data of a scene proximal the system, the locker control unit further configured to cause the generated image data to be processed to identify, using one or more facial recognition algorithms, one or more people present in the scene.

In still another embodiment of the system according to the first aspect as such or according to any previous implementation form of the first aspect, the locker central control unit is further configured to: responsive to determined identities of the one or more people, cause one or more messages selected from a set of a plurality of messages to be displayed on the at least one electronic display screen, where the one or more messages are targeted to the identified one or more people.

A second aspect of the disclosure provides a system for providing visual marketing content to customers in a retail store environment, the system including: an array of lockers, each locker of the array of lockers having a flat exterior facing surface, where all flat exterior facing surfaces of all lockers of the array are co-planar in their closed positions; a locker central control unit in communication with a server associated with the retail environment; and one or more electronic devices in communication with the locker central control unit for displaying the visual marketing content on one or more of the flat exterior surfaces, where the locker central control unit is configured to: receive data from the retail environment that is representative of an identity of one or more customers proximal the system; cause the received data to be processed by at least one of: the locker central control unit, and the server, to: identify at least one of the one or more customers proximal the system based on a comparison of the received data to pre-stored data including customer attributes associated with respective identities of at least one customer, and determine one or more messages selected from a set of a plurality of messages pre-stored in memory for targeted display to the identified at least one customer, where each message of the set of the plurality of messages includes the visual marketing content; and cause the determined one or more messages to be displayed on the one or more of the flat exterior surfaces using the one or more electronic devices.

In one embodiment of the system according to the second aspect, the system further includes a header positioned above the array of lockers and adapted to display a message to shoppers in the retail store environment.

In another embodiment of the system according to the second aspect as such or according to any previous implementation form of the second aspect, the array of lockers has at least two doors with front surfaces having electronic display screens adapted to display a message, where the messages on the at least two screens are synchronized.

In yet another embodiment of the system according to the second aspect as such or according to any previous implementation form of the second aspect, the messages on the at least two screens and the header are all synchronized.

In still another embodiment of the system according to the second aspect as such or according to any previous implementation form of the second aspect, a select customer is provided an authentication code by an order management system, where, upon presenting the authentication code to the locker control system, a locking portion for the select locker changes state and the door opens.

In another embodiment of the system according to the second aspect as such or according to any previous implementation form of the second aspect, the order management system controls the content of the message on the electronic display screen.

In yet another embodiment of the system according to the second aspect as such or according to any previous implementation form of the second aspect, responsive to the select customer presenting an authentication code to the locker control system, the order management system provides a message of pre-determined content to the electronic display screen.

In still another embodiment of the system according to the second aspect as such or according to any previous implementation form of the second aspect, the message of pre-determined content is associated with an attribute of the select customer.

In another embodiment of the system according to the second aspect as such or according to any previous implementation form of the second aspect, the message of pre-determined content is associated with an attribute of the product purchased.

In yet another embodiment of the system according to the second aspect as such or according to any previous implementation form of the second aspect, the attribute of the product purchased is the store department in which the product is located.

In still another embodiment of the system according to the second aspect as such or according to any previous implementation form of the second aspect, the electronic display on the select locker displays a message to the select customer.

In another embodiment of the system according to the second aspect as such or according to any previous implementation form of the second aspect, the system further includes a transceiver in communication with the locker central control unit and configured to receive a signal from a mobile computing device running an application associated with the retail store, where the locker central control unit is further configured to: decode the signal received from the mobile computing device; and cause the decoded signal to be processed to determine an identity of a user of the application.

In yet another embodiment of the system according to the second aspect as such or according to any previous implementation form of the second aspect, the locker central control unit is further configured to: responsive to the determined identity of the user of the application, cause one or more messages selected from a set of a plurality of messages to be displayed on the at least one electronic display screen.

In still another embodiment of the system according to the second aspect as such or according to any previous implementation form of the second aspect, to cause the decoded signal to be processed to determine the identity of the user of the application, the locker central control unit is further configured to: transmit, using the transceiver, the decoded signal to the order management system; and receive, via the transceiver, data representative of the identity of the user of the application from the order management system.

In another embodiment of the system according to the second aspect as such or according to any previous implementation form of the second aspect, to cause the one or messages to be displayed on the at least one electronic display device, the locker central control unit is further configured to: receive, via the transceiver, the one or more messages from the order management system; and cause the one or more messages received from the order management system to be displayed on the at least one electronic display screen.

In yet another embodiment of the system according to the second aspect as such or according to any previous implementation form of the second aspect, the system further includes at least one imaging device in communication with the locker central control unit, the at least one imaging device configured to generate image data of a scene proximal the system, the locker control unit further configured to cause the generated image data to be processed to identify, using one or more facial recognition algorithms, one or more people present in the scene.

In still another embodiment of the system according to the second aspect as such or according to any previous implementation form of the second aspect, the locker central control unit is further configured to: responsive to determined identities of the one or more people, cause one or more messages selected from a set of a plurality of messages to be displayed on the at least one electronic display screen, where the one or more messages are targeted to the identified one or more people.

A third aspect of the disclosure provides a computer-implemented method for providing visual marketing content to customers in a retail store environment, the method including: A) providing at least one locker system in the retail environment, the at least one locker system including: an array of lockers, each locker of the array including a door having a flat exterior facing surface, where all flat exterior facing surfaces of all lockers of the array are co-planar in their closed positions; a locker central control unit in communication with one or more memory devices; and one or more electronic devices in communication with the locker central control unit for displaying the visual marketing content on one or more of the flat exterior surfaces; B) identifying at least one customer proximal the locker system; C) determining one or more messages selected from a set of a plurality of messages stored in the one or more memory devices for targeted display to the identified at least one customer, where each message of the set of the plurality of messages includes the visual marketing content; and D) causing the determined one or more messages to be displayed on the one or more of the flat exterior facing surfaces using the one or more electronic devices.

In one embodiment of the method according to the third aspect, identifying at least one customer proximal the locker system includes identifying two or more customers proximal the locker system; the method further includes prioritizing displaying a first subset of one or more messages targeted to a first of the two or more customers over displaying at least a second subset of one or more messages targeted to at least a second of the two or more customers based on a ranking of at least one known attribute as between the first and the at least a second customer; and causing the determined one or more messages to be displayed on the one or more of the flat exterior surfaces using the one or more electronic devices includes causing the first subset of one or messages to be displayed before, or instead of, causing the at least a second subset of one or more messages to be displayed.

In another embodiment of the method according to the third aspect as such or according to any previous implementation form of the third aspect, the locker system has at least two doors with front surfaces having electronic display screens adapted to display a message, where the messages on the at least two screens are synchronized.

In yet another embodiment of the method according to the third aspect as such or according to any previous implementation form of the third aspect, the messages on the at least two screens and the header are all synchronized.

In still another embodiment of the method according to the third aspect as such or according to any previous implementation form of the third aspect, a select customer is provided an authentication code by an order management system, where, upon presenting the authentication code to the locker control system, the locking portion for the select locker changes state and the door opens.

In another embodiment of the method according to the third aspect as such or according to any previous implementation form of the third aspect, the order management system controls the content of the message on the electronic display screen.

In yet another embodiment of the method according to the third aspect as such or according to any previous implementation form of the third aspect, responsive to the select customer presenting an authentication code to the locker control system, the order management system provides a message of pre-determined content to the electronic display screen.

In still another embodiment of the method according to the third aspect as such or according to any previous implementation form of the third aspect, the message of pre-determined content is associated with an attribute of the select customer.

In another embodiment of the method according to the third aspect as such or according to any previous implementation form of the third aspect, the message of pre-determined content is associated with an attribute of the product purchased.

In yet another embodiment of the method according to the third aspect as such or according to any previous implementation form of the third aspect, the attribute of the product purchased is the store department in which the product is located.

In still another embodiment of the method according to the third aspect as such or according to any previous implementation form of the third aspect, the electronic display on the select locker displays a message to the select customer.

In another embodiment of the method according to the third aspect as such or according to any previous implementation form of the third aspect, the system further includes a transceiver in communication with the locker central control unit and configured to receive a signal from a mobile computing device running an application associated with the retail store, where the locker central control unit is further configured to: decode the signal received from the mobile computing device; and cause the decoded signal to be processed to determine an identity of a user of the application.

In yet another embodiment of the method according to the third aspect as such or according to any previous implementation form of the third aspect, the locker central control unit is further configured to: responsive to the determined identity of the user of the application, cause one or more messages selected from a set of a plurality of messages to be displayed on the at least one electronic display screen.

In still another embodiment of the method according to the third aspect as such or according to any previous implementation form of the third aspect, to cause the decoded signal to be processed to determine the identity of the user of the application, the locker central control unit is further configured to: transmit, using the transceiver, the decoded signal to the order management system; and receive, via the transceiver, data representative of the identity of the user of the application from the order management system.

In another embodiment of the method according to the third aspect as such or according to any previous implementation form of the third aspect, to cause the one or messages to be displayed on the at least one electronic display device, the locker central control unit is further configured to: receive, via the transceiver, the one or more messages from the order management system; and cause the one or more messages received from the order management system to be displayed on the at least one electronic display screen.

In yet another embodiment of the method according to the third aspect as such or according to any previous implementation form of the third aspect, the system further includes at least one imaging device in communication with the locker central control unit, the at least one imaging device configured to generate image data of a scene proximal the system, the locker control unit further configured to cause the generated image data to be processed to identify, using one or more facial recognition algorithms, one or more people present in the scene.

In still another embodiment of the method according to the third aspect as such or according to any previous implementation form of the third aspect, the locker central control unit is further configured to: responsive to determined identities of the one or more people, cause one or more messages selected from a set of a plurality of messages to be displayed on the at least one electronic display screen, where the one or more messages are targeted to the identified one or more people.

In another embodiment of the method according to the third aspect as such or according to any previous implementation form of the third aspect, the at least one locker system further includes a header positioned above the array of lockers and adapted to display a message to shoppers in the retail store environment.

Further and alternative aspects and features of the disclosed principles will be appreciated from the following detailed description and the accompanying drawings. As will be appreciated, the principles disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIGS. 5A-5D illustrate aspects of the disclosed locker system providing personalized marketing messaging, according to some embodiments of the disclosure.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice versa without limiting the scope of the disclosure to the exact number or type of such elements unless set forth explicitly in the appended claims. The terms configured, configuration and adapted may be used herein to refer to a specified arrangement, or a structural size and shape.

Figure 1:
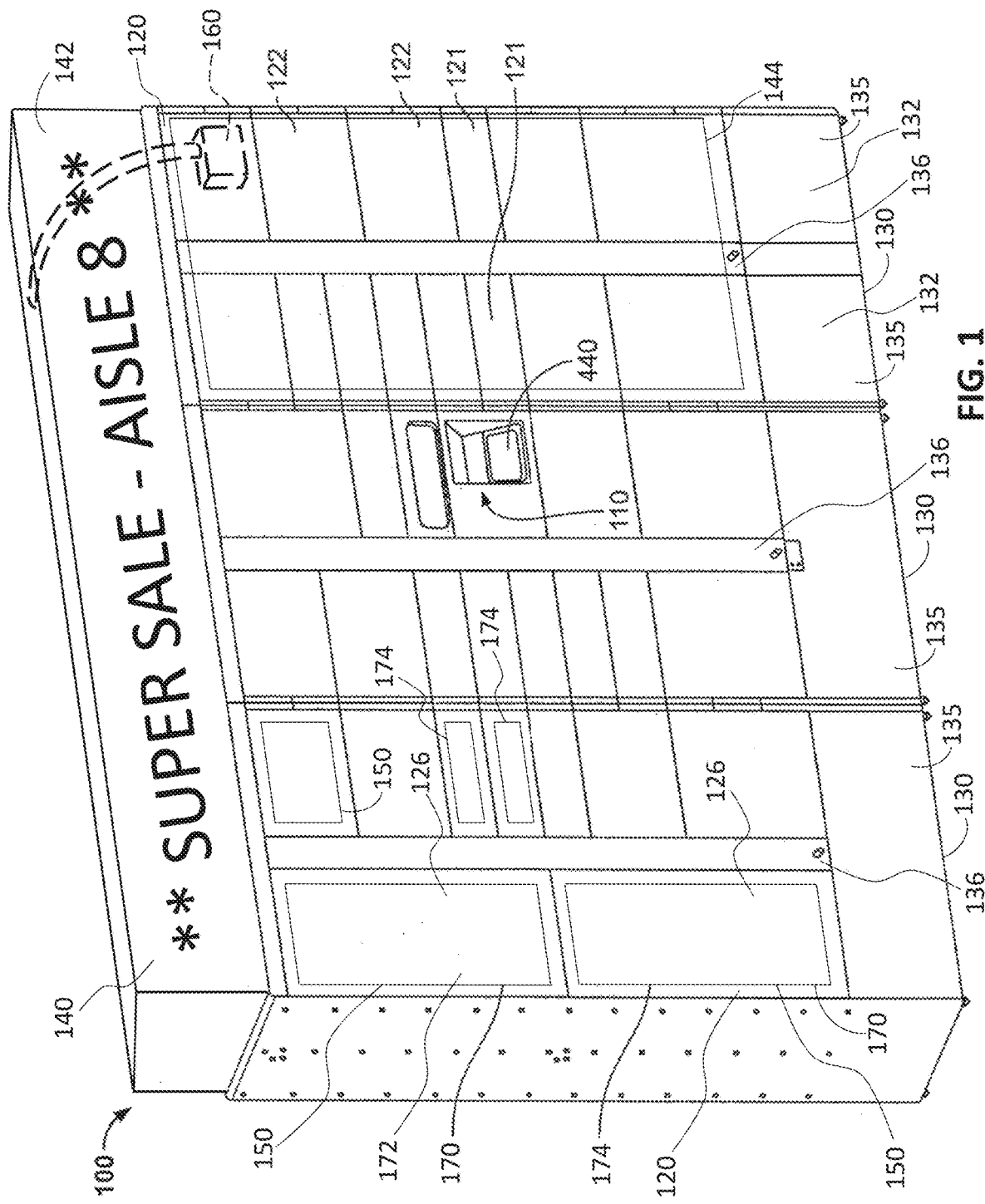
FIG. 1 is a perspective view of an installed embodiment of the package management system.

FIG. 1 illustrates one embodiment of the system 100 that allows for the system's user, or receiver, to securely receive items. Although the system 100 is described as a package management system for use in any location in this specification, those of ordinary skill will recognize the benefits that will arise from employing this system in other areas beyond packages. For example, in a retail store, the retailer can place a locker system 100 at a convenient location for a consumer to pick up an item previously purchased on the internet so the consumer does not need to go through a checkout line. Further, the items need not be packages deposited by a shipper or a retailer. For example, the system could be incorporated into any secure transfer of items in a peer-to-peer relationship. Moreover, the system can include other items such as clothing that has been dry-cleaned, food from the deli counter or restaurant section of the store, or other delivery services, or about anything that can be purchased at a retail store.

Figure 2:
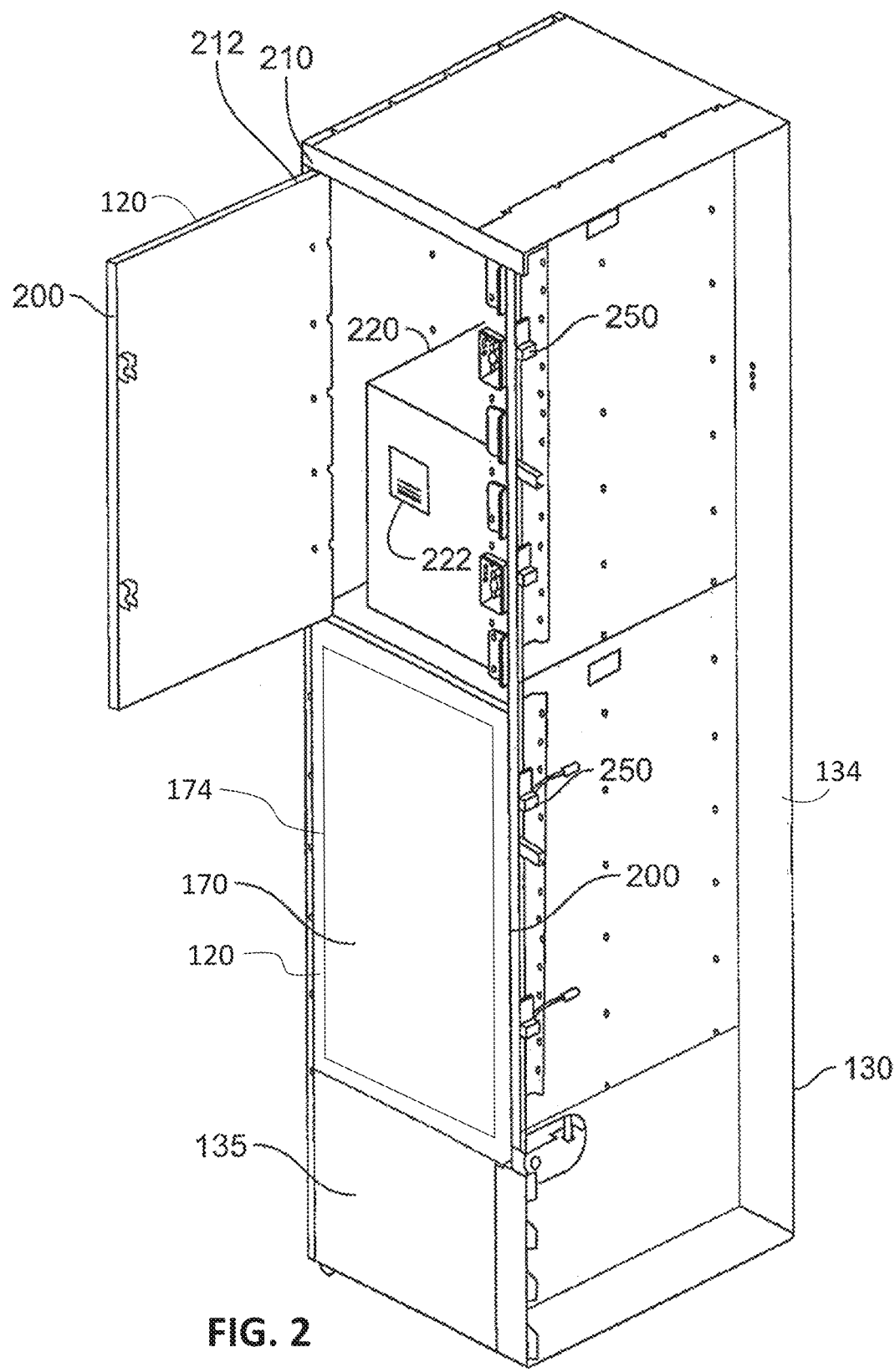
FIG. 2 is a perspective view of one embodiment of a storage locker module with one locker having a package inside, a hinged door and a locking portion.

The system includes a locker central control unit 110 and a plurality or array of storage lockers 120. In the embodiment shown in FIG. 1, the array of storage lockers 120 can be arranged in a set of three storage locker modules 130. Each module 130 may include one, or a plurality of, lockers 120. Referring now to FIG. 2, each column 132 of lockers 120 has vertical co-linear hinges 210 near the outside walls of the module 130 and a number of locker doors 200 mounted on the co-linear hinges 210. Multiple storage locker modules 130 are arranged in an array with the locker central control unit 110 to form the package management or locker system 100. Multiple storage locker modules 130 can have storage lockers 120 of various sizes, as shown in FIG. 1. The locker central control unit 110 controls each of the storage lockers 120 of the storage locker modules 130. The central control unit 110 can also receive information from each of the storage lockers 120. The central control unit 110 can directly control at least the locking portion for each of the storage lockers 120. Individual senders and receivers interact with the central control unit 110 of the system 100 to, for example, deposit and remove items.

Storage Lockers

Each of the storage lockers 120 is dimensioned to have an interior volume to be suitable for receiving and storing purchased items, packages, letters, food, dry-cleaning, and other items of various dimensions. FIG. 2 shows a locker 120 having a package 220 received in its interior space. In this instance, the package has a package identifier 222 on one sidewall. Examples of package identifiers include bar codes, RFID tags, common carrier shipping labels and person/person labels. However, the package does not need to have a package identifier 222 associated with it provided that the locker control system is in communication with other package or order management systems, such as a retail store order management system 400. In instances where there is no package identifier, the depositor or store employee must ensure that the proper items for the recipient are placed in the locker, most notably through communication with the order management system 400 and locker control system 110.

As used herein, "order management system" means a computing system having order receiving, entry and processing functionality, including as facilitated by software. By way of example only, a retail store chain having a website in addition to brick-and-mortar store location(s) may utilize an order management system for e-commerce purposes in connection to orders and/or purchases made by customers via a store website. Additionally, the order management system may be employed to enter orders that are placed by customers over the phone or in person. In their modern usage, order management systems may include various other functionality above and beyond order receipt, entry and processing. For instance, order management systems may integrate such other functions in a networked computing environment to provide pertinent information about retail inventory, order status, product information, and the like, so as to maintain a repository of up-to-date information that can be maintained by the retail store for the benefit of both e-commerce and traditional shopping purposes. Types of functionality that the order management system can provide include, for example, and without limitation: Product information (descriptions, attributes, locations, quantities, attribute(s) of the product purchased); Inventory available to promise (ATP) and sourcing; Vendors, purchasing, and receiving; Marketing (catalogs, promotions, pricing); Customers and prospects (e.g., customer attributes like demographics, order/purchase history, store website browsing activity, store visits, etc.); Order entry and customer service (including returns and refunds); Financial processing (credit cards, billing, payment on account); Order processing (selection, printing, picking, packing, shipping). In the field of e-commerce operations, and in the retail context in particular, order management systems may also be referred to as e-commerce systems, incumbent store systems, chain inventory management systems, and supply chain management systems, among others.

As used herein, "retail store environment" means a physical location or set of locations in which actual or potential customers engage in activities related to some commercial or psuedo-commercial purpose. By way of example, a retail store environment may include a department store, wherein people enter the store to shop for items of interest to them. The disclosed systems, methods and software used in such a store may, in practice, include system 100 positioned near the entrance of the store. In another example, the disclosed systems, methods and software may be used in a common area of a residential facility (e.g., a college dorm or apartment building). In such cases, system 100 and the associated methods described herein may be practiced for purposes of streamlining the operations of one or more mail and/or package shipping servicers (e.g., USPS, FedEx, UPS, DHL, etc.) in a manner benefiting the residents of the facility. The above examples provided in connection with the definition of "retail store environment" are not intended to be limiting, and the disclosed systems, methods and software may be advantageously employed in any context where operators of facilities having, for example, system 100, need or desire to provide marketing and/or other informational content to people who are engaged in various activities related to the operators' facilities.

As described in greater detail below, the disclosed systems, methods and software utilize order management systems to enable locker systems (e.g., system 100) to be employed by retailers at, or inside, their brick-and-mortar store(s). As we will become apparent from the entire disclosure, the systems, methods and software described herein enable use of order management systems and/or other additional, or distinct, networked computing devices to deliver marketing and other informational content using the locker system, including in a dynamic and personalized manner to select (e.g., targeted) customers.

Non-limiting examples of the dimensions of the storage lockers 120 include a height of approximately 5", 10", 15" 20", 25" and 30", a depth of less than 24", and a width of less than 18". In one embodiment, the height of an individual locker is an integral size larger than the smallest size locker. For example, FIG. 1 shows lockers of the smallest size 121, double size 122, triple size, quadruple size, quintriple size and sextuple size 126. In another embodiment, lockers of sufficient size to accept a pallet of goods is contemplated.

Each storage locker 120 is made of durable materials such as high strength steel and includes at least one door with a flat exterior and a locking portion to help secure packages. FIG. 2 illustrates an example of the storage locker 120 with a hinged 210 door 200 that is attached to the structure of the respective storage locker 120. In this embodiment, the hinged door 200 opens outwardly so that the interior can be accessed and items can be deposited and stored inside the storage locker 120. The door may have an associated door position indicator 212 connected to the locker central control unit 110 to provide the central control unit 110 information on the state of the door as being open or closed.

Each storage locker 120 can include an individual communications connection and a power connection. These communications and power connections are adapted to connect to corresponding connections in the storage locker modules 130. Each storage locker 120 can further include processing hardware for controlling aspects of the storage locker and for processing information regarding the storage locker. The wiring and other communication hardware to the door position indicator 212 and locking portion 250 can be routed during the manufacture of the locker module 130 at which time wiring can also be run for powering and controlling video displays such as video screens 150 mounted on the locker doors 120, headers 140 or video projectors 160 that project images on the locker doors 120.

In one embodiment, at least one of the doors 200 in a module may be provided with an electronic display such as video or still image screen 150, such as LED screens or LED film 170. Thin, flat screen LED screens 172, such as those manufactured by LG, Samsung or the like can be mounted on the outside of the door 200 and proper power and control wiring connected through appropriately placed apertures in the door. Alternatively, LED film or sheets 174, such as those marketed by FLEx Lighting LLC, Materia Exhibitions or Street Communication can be adhered to the exterior of the door 200 with appropriate accommodation of control wiring. The screens 170 can cover anywhere from a portion of a single door to having multiple screens that would cover substantially all of the doors 200 and walls 136 of the system 100. If multiple screens are used, the messages on the screens can be independent or they can be synchronized to create a single larger image or coordinated set of images. Since the locking portions 250 and door position indicators 212 require electrical wiring, the wiring to the electronic displays can be readily included in the system. The video screens can also be used to help the consumer identify the locker that is about to be or has been opened by flashing a communication to the consumer of the appropriate locker when the customer is retrieving her package.

Storage Locker Locking Portion

FIG. 2 also illustrates the door 200 for each storage locker 120 is secured by at least one locking portion 250. The locking portion 250 secures the door 200 so that the items within the storage locker 120 are only accessible to authorized individuals. In one embodiment, the locking portion is activated and locks the locker when the door is shut and unlocks the locker and biases the door open when a command is received from the central control unit. In another embodiment, the storage locker locking portion 250 is also configured to latch without locking so that the door 200 can be closed without changing the locking portion's lock state.

Each locking portion 250 receives commands from the central control unit 110. In response to the command transmitted by the central control unit 110, the locking portion 250 changes its state. For example, a locked locking portion 250 unlocks in response to the command from the central control unit 110. In one embodiment, when receiving a command from the central control unit to change the state from the locked condition to the unlocked condition, the locking portion 250 also biases the door open and a door position indictor 210 transmits information to the central control unit that the door is open.

Storage Locker Modules

Each storage locker module 130 can include identical storage lockers 120 or a variety of differently dimensioned storage lockers 120 to match expected package mixtures. FIG. 1 illustrates non-limiting examples of three storage modules 130 with a variety of sizes of storage lockers 120. The storage locker module 130 with the plurality of storage lockers 120 and the hardware specific for the storage locker module 130 can be 7' or 8' high. Other heights suitable for the installation location are contemplated and not specifically enumerated here. In some installations, a package management or locker system 100 can comprise numerous locker modules all connected to a single central control unit 110.

Preferably, a header 140 sits atop the module 130 or set of modules as shown in FIG. 1. The header is approximately a foot high and runs the length of the array of modules. The exterior of the front wall 142 of the header 140 can provide space for either static or dynamic promotional or educational messages or other material. For example, in an embodiment with three modules, as shown in FIG. 1, with the header 140 being relatively long, a dynamic scrolling sign promoting a sale in a particular department of the retail store could be marching across the header from left to right in an array of lights. The header can be an array of individual lights or LED's along with dedicated control systems to create static or moving images. In one embodiment, the message on the header 140 can be coordinated with the message on at least one of the video screens 150 on the doors 200 to create a unified message to the store shopper. In another embodiment, the message in the header 140 can be coordinated with the store department of the purchased item through the messaging system 500 and the order management system 400.

In one embodiment, as shown in FIG. 1, each module 130 comprises a pair of columns 132 of lockers. The columns 132 for each module have locker doors 200 with smooth exterior walls that have outboard facing hinges 210 and inboard facing locking portions 250. The locking portions are on either side of a central space 134 for each module 130. By this construction, the doors 200 for lockers 120 on the right of the central space 134 open to the right and those to the left of the space 134 open to the left. The space 134 is covered by a vertical wall or door 136 that is co-planar with the doors 200 so that the front of the locker system 100 is relatively flat. The bottom portion of each module 130 also has a cover 135 co-planar with the doors 200 and vertical walls 136 to create a substantially solid planar wall. Although there are small creases or slots around the periphery of each door, the face of the system can be considered a substantially flat wall. In some embodiments, the doors 200 and walls 136 may be painted in a gloss smooth light colored or white paint. The entire front face of the system 100 or a portion, such as a majority of the surface of the right hand module 130 of FIG. 1 shown diagrammatically as 144 can then create a video display as a screen for a video projector 160 mounted either above or in front of the system. The projector 160 can be easily wired into the wiring in the locker system and controlled by either the locker central control unit 110, the messaging system 500 or the order management system 400 to project either still images or moving videos or other messages. In a preferred embodiment, an ultra-short throw projector, such as a Vivitek DH758UST or equivalent is mounted above and slightly in front of the bank of lockers. A standard ultra-short throw projector can project a five-foot image measured diagonally from 1.4 feet away. For example, an image could be projected on the entire right module of FIG. 1 and still have high clarity. Other substantially equivalent projectors, such as Epson BrightLink 710Ui 4000-Lumen WUXGA Ultra-Short Throw 3LCD Laser Interactive Projector, Optoma Technology EH320USTi 4000-Lumen Full HD Ultra-Short-Throw DLP Projector, or Epson BrightLink Pro 1460Ui 4400L WUXGA Ultra-Short Throw 3LCD Projector are also contemplated.

Locker Central Control Unit

The locker central control unit 110 uses a variety of components to control each of the locking portions 250 of the storage lockers 120. The central control unit 110 can include storage lockers 120 in addition to the components described here so that the number of storage lockers 120 employed in the system 100 is maximized.

In one embodiment, the central control unit 110 includes a control module having input devices including at least a human input device and a computer readable code device, processors, memory, storage, and a display device connected to a display interface. In another embodiment, no active human interface is needed, but the interface automatically recognizes a select receiver or customer electronically when he or she is in close proximity to the system. The display device can be a touchscreen and therefore operate as an input device. The central control unit 110 may also include a communications portion for connecting to the Internet or directly to an order management system, such as a retail store order management system 400. The central control unit 110 further includes a storage locker connection portion, which connects the central control unit 110 to at least one storage locker 120. In some embodiments, the connection from the central control unit 110 to the storage locker 120 can be aggregated through the storage locker module 130. Stated differently, the central control unit 110 can have a single connection to the storage locker module 130, which connects a plurality of storage lockers 120 to the central control unit 110 by way of the storage locker module 130. The different components of the central control unit 110 are connected to each other by way of well-known communications infrastructure. The central control unit 110 provides power and commands to each storage locker 120 and can receive information from each storage locker 120.

The central control unit 110 may also include a plurality of input devices, for example, a still camera, an optical character reader (OCR) a barcode reader, and a key fob or RFID reader. Other embodiments of the central control unit 110 include biometric sensors, audio sensors, other RFID sensors, proximity sensors, Bluetooth proximity sensors, near-field communication sensors, ID or credit card swipe readers, printers, such as label printers and other types of information collecting devices as input devices. Any number of input devices can be employed in a central control unit 110. The central control unit 110 uses these sensors in a variety of ways to collect the desired information from a user, such as a store employee or a consumer, from packages, and from the environment and considers this information when making decisions. For example, it can act as an authenticator to verify the status of a delivery person, such as a store employee designated to deliver purchased items to a selected locker. Input from the door position sensor 212 provides the central control unit 120 information on the state of the door for each locker 120. In addition, the central control unit 110 can use this information to control each of the locking portions 250 of the storage lockers 120 in the package management system 100. The central control unit 110 can, in some embodiments, use aspects of the individual storage lockers 120 when controlling each of the locking portions 250. For example, the central control unit 110 can consider if the locking portion 250 or the door position indicator 210 is providing status information that indicates the locking portion 250 is unlocked or the door is open before transmitting commands.

The locker central control unit 110 executes locker control software and provides a user interface on the display device by controlling the display interface. The display interface can also function as an input portion when the display device is a touchscreen device. For example, the display device or the input device may include a list of approximate sizes of packages that can be accommodated by the array of lockers. The delivery person or store employee can choose from the list and input the size that best matches the size of the package to be delivered. The central control unit 110 can then identify an appropriately sized locker to match or slightly exceed the size of the purchased item or package.

When referring to the central control unit 110, aspects can be executed by hardware components purposely built for executing these aspects, and other aspects can be executed by software components of the locker control software being executed on hardware components that perform multiple aspects. The user interface provides information to the user and requests input from the user through the input devices. The central control unit 110 can also provide audible feedback in response to input.

Information collected by sensors of the individual storage lockers 120 is transmitted to the central control unit 110 for consideration by the locker control software. In some embodiments, the sensor information is preprocessed by an aspect of the storage locker 120 so that status information is transmitted to the central control unit 110. In some embodiments, other types of information can be considered by the central control unit 110 including information received from external sources over the Internet, information from the store management system 400 and information received from authorized devices wirelessly connected to the central control unit 110. The central control unit 110 can, for example, wirelessly communicate with a device in a store employee or consumer's possession for authentication. The central control unit 110 uses the different information from the sensors to determine if an action is necessary. An action can include unlocking a locked storage locker 120, locking an unlocked storage locker 120, transmitting a notification, authenticating a user, responding to user input, scanning a package, updating the status of a storage locker 120, controlling the message on one or more video screens 150 or header 140 and other tasks needed to respond to sensor inputs as desired. The central control unit 110 uses industry standard techniques to connect to the Internet and a central server for an order management system 400 and a message control system 500, for example using either wired or wireless networking technologies.

Some embodiments of the central control unit 110 include a notification portion for transmitting item availability notifications to consumers. In other embodiments, the order management system 400 transmits notification to the consumer that their package is available. The notification portion of either can use a connection to the Internet when the type of notification transmitted is facilitated by using the Internet. The notification portion can use other communications networks to transmit the notification. For example, the notification portion can rely on a cellular network connection to transmit an SMS message to the consumer. The notification portion can rely on other communications techniques using other communications networks such as Wireless Ethernet, ZigBee™, Bluetooth, and similar networks configured for a specific device or application. For example, if the purchaser is shopping at the retail location, the central control unit 110 or order management system can detect a particular smartphone within proximity to remind the user of the smartphone that a package is available. Either the notification portion can directly transmit the notification to the smartphone using a communications network, or the notification portion can use the connection to the Internet to transmit a notification to the smartphone.

Store Management System

As the name suggests, store management system 400 controls all operations within the store as well as external interactions. The store management system 400 incorporates retail or ecommerce communication ecosystem, for example an order management system, an ecommerce system, a fulfillment system, a promotional system or any combination thereof. One subsystem of the store management system is the order management system 450, which controls the inventory and sales accounting for the retail operation. The store management system 400 servers or cloud-based data can have information on the quantity and pricing of all items for sale, all store personnel and all promotional activities associated with the store. It can provide an authorization code to the locker control system for each employee. Moreover, it can assign an authorization code to a consumer who has ordered an item to be picked up at the store and send an invoice upon pick up. This authorization code can be transmitted in various ways to the consumer as noted above and also communicated to the locker control system 110 so that when the authorized consumer approaches the locker control system reader the locker control system 110 will open the appropriate locker.

The store management system 400 also communicates with a digital signage, promotional message system 500 that may be stand alone, part of the locker control system 110 or integrated into the store management system 400. The promotional message system 500 controls the messaging on the video screens or film 150, 172, 174, projectors 160 and header 140 associated with the locker system 100. In one embodiment, the promotional system 500 is incorporated into and becomes a part of the locker control system 110. As noted above, this communication can either be directly between the store management system 400 and the video screens 150 and header 140 or using the locker control system 110 or message control system 500 as an intermediary.

In one embodiment, the message control system 500 is the link between the order management system 400 and the message transmitters 520, such as the LED screens or film 170, projectors 160 or header 140. In one embodiment, the retail store is divided into departments, such as home goods and sporting goods, and the message control system has promotional images and videos for each department. The order management system 400 knows from which department the article to be retrieved by the select customer originated and can instruct the message control system to play the appropriate message during the retrieval by the customer. This provides an opportunity for upselling to the customer without the need for tying up store personnel. In another embodiment, the order management system 400 contains records of attributes of existing customers. Such attributes may include information on prior purchases of that customer, preferred payment terms, demographic data or other likes or dislikes of the customer. The order management system 400, possibly through the message control system 500 and use this data to tailor the message to the customer when the customer is in the vicinity of the locker system based on one or more of the known attributes of the customer.

Figure 3:
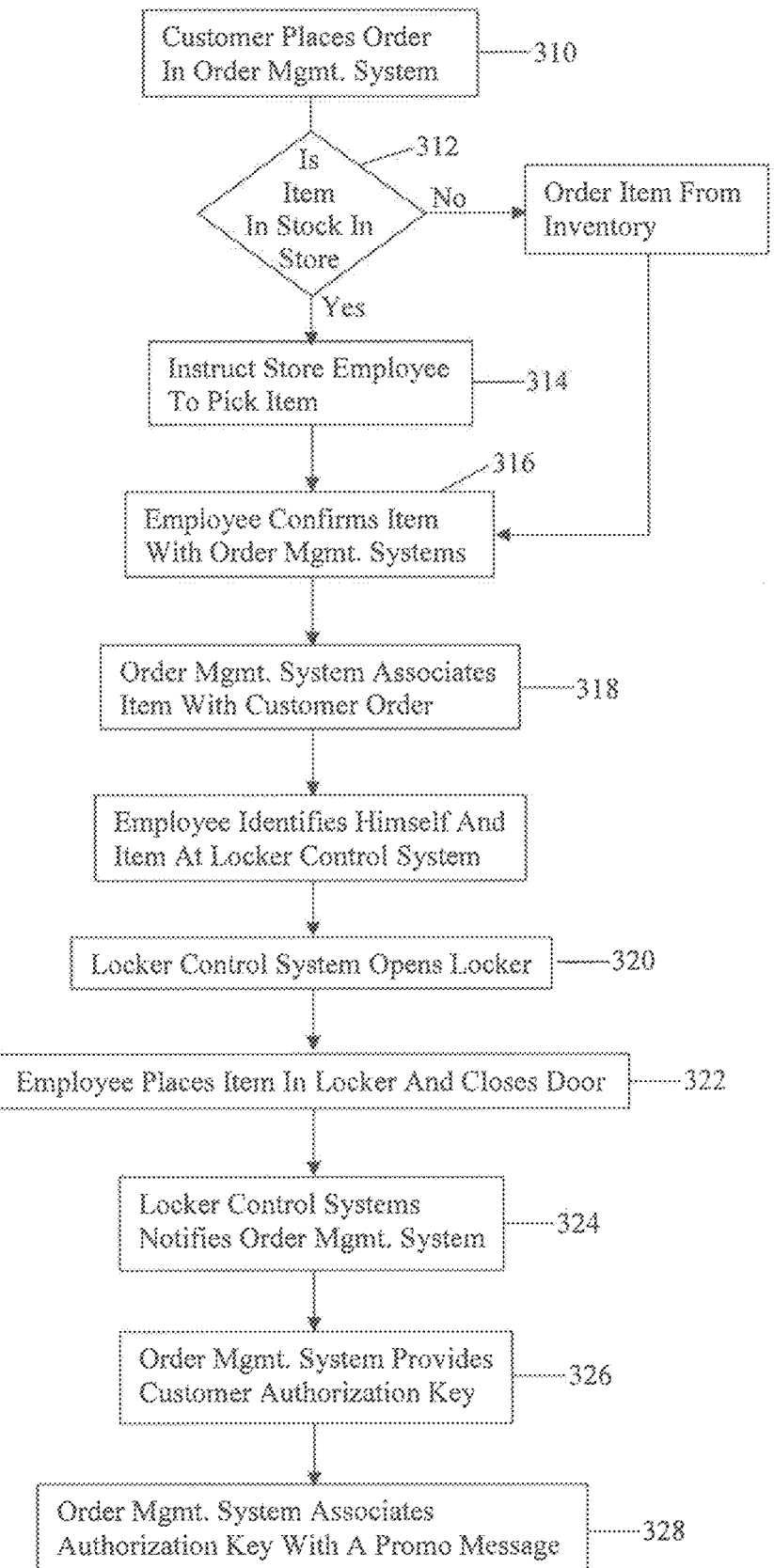
FIG. 3 is a flow chart diagram of the steps from a customer order to placing a package in a locker and queuing up a promotional message according to one embodiment.

With reference to FIG. 3, operation of embodiments of the package management system 100 is now presented. In one embodiment, a consumer orders 310 a product on-line on the website of a ship-to-store retailer and specifies a local store to pick up the product. The retailer order management system 400 indicates whether the local store has the product in inventory or whether it will need to be shipped to the store from a warehouse 312. If in stock, a store employee picks the item from the store inventory 314. In either event, the product ends up at the store; the store employee confirms 316 with the Order Management System 400 which associates the item with the customer order 318. Subsequently, the customer is notified at this point or when the employee places the product in the locker that he or she can pick up the product at the local store at their convenience and an authentication code is sent to consumer. If the customer is notified at this point, Order management system assumes the employee will place the product in a locker before the customer arrives at the locker and the exact locker location must be included in the authorization code when the product is placed by the employee.

The store employee uses the order management system 400 and the locker control system 110 to identify and open an appropriately sized locker, places the product in the locker and closes the door 322 at which time the locker control system 110 notifies the order management system 400 that the package is in the appropriate locker 324. The order management system may at this time generate and send to the customer an authorization key 326 and associates the authorization key 326 with an appropriate promotional message 328 that can be ready to be played when the customer is in the vicinity. The authentication key may be sent to the customer in an email, text message, or a picture or multimedia message. These emails or messages which contain the authentication key (e.g., as a barcode, a QR code, or an alphanumerical pin) may further contain promotional message(s) that are viewable by the customer viewing the email or message having his or her authentication key.

Figure 4:
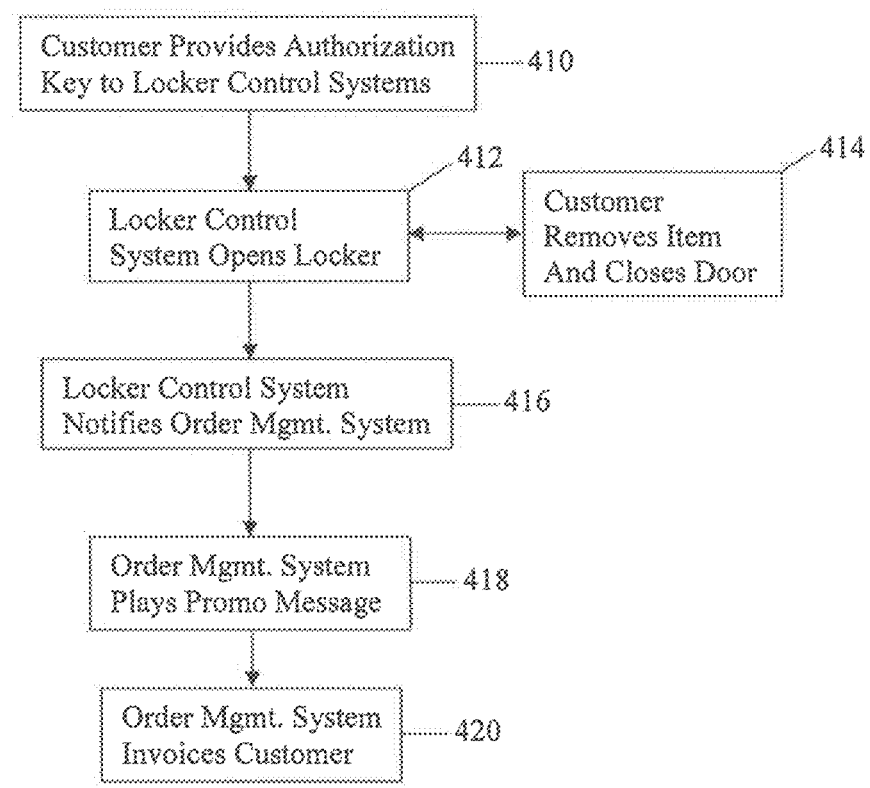
FIG. 4 is a flow chart diagram of the steps from a customer presenting her authorization key to invoicing according to one embodiment.

Referring to FIG. 4, when the consumer shows 410 the authentication code 326 to the locker control system 110, the correct locker door opens 412 and the consumer retrieves the purchased product 414. In one embodiment, when the consumer closes the door 414, the locker control system assumes the locker is empty so it can be available for the next purchased product. The locker control system 110 also communicates 416 with the order management system 400 to indicate that the transaction has been completed and the customer can be invoiced 420.

In one embodiment, while the consumer is retrieving the product, the locker control system 110 on its own, or in cooperation with the order management system 400 and/or the message control system 500, can target 418 a promotional or instructional message 328 to the consumer. Since the system knows certain attributes of the person opening the locker, such as who the consumer is and what was just purchased, a general/generic communication or a very targeted advertisement, such as for a complementary product can be presented to the consumer. Alternatively, messages concerning goods in related departments can be played during the retrieval.

If the store order control system 400 or the message control system 500 needs to be queried during the retrieval process, the touch screen may initially flash a message advising the customer that the retrieval is in process. In one embodiment, the order management system 400 is involved in the retrieval process because the invoicing of the customer for the article purchased only takes place upon retrieval. The touch screen may also be used to display a promotional message to the select customer during the retrieval process.

Modifications

Although the above described package management system has been described, modifications to the system are contemplated by this disclosure. In some embodiments, a nearfield communications device, Bluetooth device, or other wireless device can be used in order to identify a particular user instead of an RFID tag or a key fob.

EXAMPLES

The disclosed locker system may be advantageously deployed in retail and other application environments to communicate dynamic marketing messaging to actual or potential customers in a wide variety of contexts. These marketing and/or educational messages in the form of video, still images, scrolling text, and/or scrolling images may be provided for display to customers who are interacting directly with the disclosed locker system (e.g., to remove shipped to store items they ordered) and/or people who are walking past the locker system but not engaging in locker-associated activities.

The locker system may provide the displayed marketing and/or informational messaging in multiple forms and/or with various content at the same time and/or with a sequential presentation over time. For instance, one or more customers who are positioned proximal the locker system to obtain items from locker(s) may receive a video transmitted to them via one or more electronic displays and/or projectors positioned proximate respective lockers. Meanwhile, header display(s) positioned, for example, atop the locker system may display a promotional marketing message which may be of interest to a wider swath of customers (e.g., "SUPER SALE IN AISLE 8," as shown in FIG. 1).

A related advantageous use case for the disclosed locker system is where there are no customers who are actively engaged in using the locker system for unlocking and/or locking ordered items. In that situation, an embodiment of the disclosed locker system having a plurality of displays in addition to the header display(s) may simultaneously display multiple marketing and/or promotional messages having several types of content. As with the header display(s) where the content displayed on it may be visible at relevant distances away from the locker system by passerby customers of the store or people in the vicinity thereof, using a plurality of displays to provide dynamic marketing content may create both a visually pleasing effect and entice people to read the displayed content.

Furthermore, the various embodiments of the disclosed locker system enable operators thereof to enjoy a high level of flexibility with types of content, positioning of the content, and timing and/or sequencing of the content. The content may be tailored to particular customers or groups of customers, and/or the displayed content may be more generally applicable to customers or potential customers. Moreover, the disclosed locker system provides operators (e.g., proprietors of retail stores) additional income opportunities to charge a fee to third parties to display marketing content related to their products or services (e.g., rental of high quality and high visibility ad space). The above-described and other examples and use cases illustrate how the disclosed locker system and associated methods can facilitate a higher return on investment for retailers and other operators to enjoy in addition to providing the ability of their customers to conveniently enjoy ship-to-store or return-to-store activities after ordering items online. In many instances, utilizing the disclosed locker systems and associated methods enable operators to recoup the costs of the locker system and its installation and/or maintenance, and further to generate increased sales and/or create new income streams well above and beyond those costs.

Personalization of marketing messaging is a major area of interest and innovation in the retail space. As opposed to messaging geared to communicate content from one retailer to many customers ("one-to-many"), personalization of marketing provides retailers the ability to convey marketing content to customers on a one-to-one (or one-to-group) basis.

FIGS. 5A-5D illustrate aspects of the disclosed locker system providing personalized marketing messaging, according to some embodiments of the disclosure. In the illustrated examples of FIGS. 5A-5D, the locker system 100 includes a plurality of electronic displays on all, or most, doors of the locker array. The plurality of electronic displays may be grouped in substantially continuous sets so that two or more different videos or static images may be concurrently displayed on exterior facing surfaces of the locker doors of the array. The header 142 may also be utilized concurrently to display videos and/or static images. Also, concurrently, audio may be played so as to be heard by actual or potential customers (depicted as stick figures in FIGS. 5A-5D) in the vicinity of the locker system 100. This audio may be synced to a video and/or static image being displayed on one or more of the electronic displays and/or the header, or it may have separate related and/or unrelated content.

The locker system 100 includes at least one wireless transceiver 501 positioned in or on the locker system 100 for receiving and/or transmitting signals (e.g., Bluetooth) from a retail environment 500 proximal (e.g., within a transmit and receive range of mobile computing devices 502 such as smartphones carried by actual or potential customers) locker system 100. The transceiver 501 is coupled in wireless and/or wired communication with the locker central control unit (not shown in FIGS. 5A-5D). In some embodiments, the locker central control unit is further coupled in wireless and/or wired communication with a server 560. Communication and/or transmission of signals carrying data between the server 560 and the locker central control unit may be facilitated using the transceiver 501. In some embodiments, the order management system resides, at least in part, on the server 560, and the server 560 is associated with the retail store environment 500 as well as an app for the retail store. Locker central control unit may utilize the server 560 for providing memory storage, communication, and/or other cloud-based functionality (e.g., software-as-a-service (SAAS)). In some embodiments, locker system 100 includes at least one imaging device 530 (e.g., a still and/or video camera) positioned on or in the locker system 100 (e.g., atop the header 142).

Figure 5A:
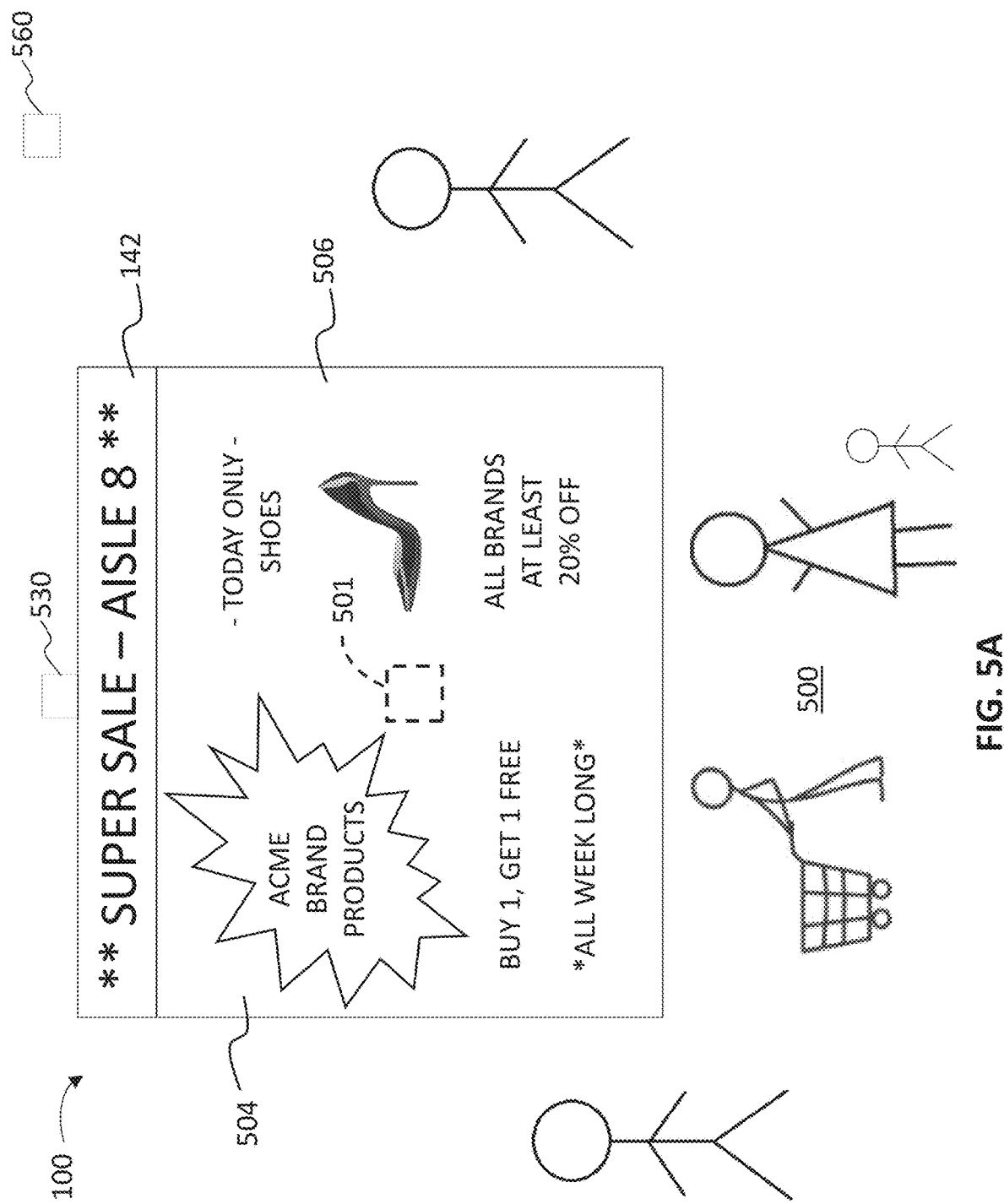

In FIG. 5A, none of the customers in retail store environment 500 proximal system 100 have smartphones. In this use case, locker central control unit causes two marketing messages to be displayed on electronic displays of a first 504 and a second 506 half of the customer-facing exterior facing surfaces of locker doors of the locker array. Concurrently, the header 142 displays a third marketing message. In this case, smartphones are not being carried by customers, and transceiver 501 does not receive any pertinent signals from environment 500. As such, in the example of FIG. 5A, 1-to-1 marketing messages targeted to individuals and/or groups of customers based on their identities determined via signals emitted by the smartphones is not available. The system 100 surficial real estate is still advantageously used, however, with more generally applicable marketing messages that are selected to be of broad interest to customers and others in the vicinity of locker system 100 being displayed, as shown in FIG. 5A.

Figure 5B:
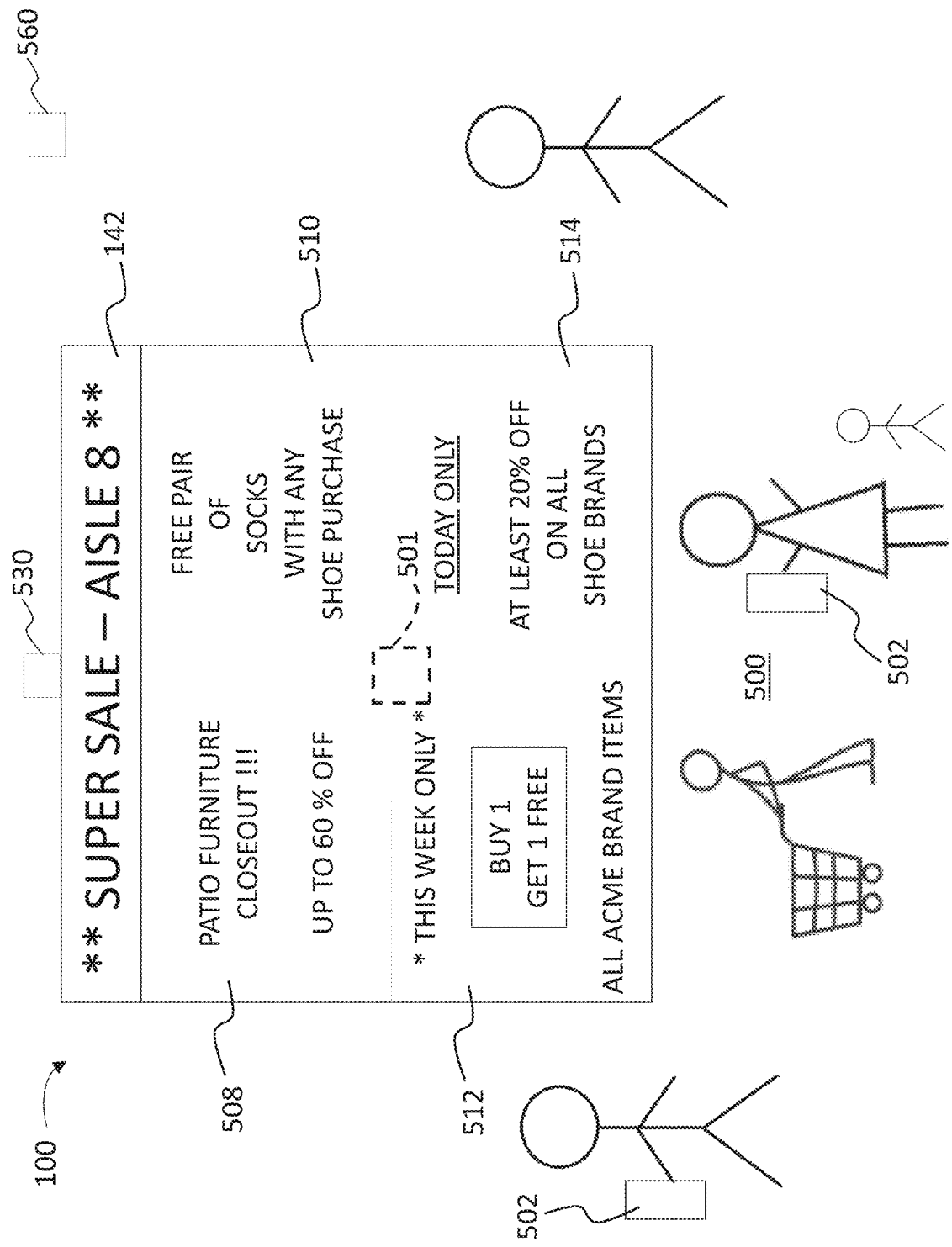

In FIG. 5B, at least one of the actual or potential customers in retail environment 500 proximal system 100 have smartphones running an application (e.g., "app") associated with the retail store having system 100. In this use case, transceiver 501 receives Bluetooth and/or other signals from smartphone running the app. Locker central control unit may decoded these signals, and these signals may be further processed to determine the identities of those respective customers. Determining customer identities enables the locker central control unit to cause one or more marketing messages that are targeted to individual (or groups of) customers to be displayed on one or more of the electronic displays, by the projector(s), and/or on header(s) 142 of system 100. In the example illustrated in FIG. 5B, locker central control unit causes four marketing messages to be displayed on electronic displays of a first 508, second 510, third 512 and fourth 514 quadrants of the customer-facing exterior facing surfaces of locker doors of the locker array.

In the case shown in FIG. 5B, a female customer with the store app running on her smartphone is identified and, based on one or more of her known and/or inferred customer attributes stored in at least one memory device of server 560, locker central control unit, and/or elsewhere (e.g., her last purchase was a pair of shoes), the marketing message(s) caused to be displayed in the second 510 and fourth 514 quadrants are targeted to her, so as to grab her attention as she passed by system 100, and regardless of whether or not she has a need to utilize system 100 lockers for retrieving and/or returning purchased items. A male customer with the store app running on his smartphone is also shown in FIG. 5B. He is identified and, based on one or more of his known and/or inferred customer attributes stored in the memory device(s) (e.g., his last purchase was an Acme brand outdoor tablecloth), the marketing messages caused to be displayed in the first 508 and third 512 quadrants are targeted to him, so as to grab his attention as he passed by system 100, and regardless of whether or not he has a need to utilize system 100 lockers for retrieving and/or returning purchased items. Meanwhile, as shown in FIG. 5B, a fifth marketing message of more general applicability to a broader swath of actual or potential customers is caused by locker central control unit to be concurrently displayed on the header 142.

In FIG. 5C, at least one of the actual or potential customers in retail environment 500 proximal system 100 are utilizing system 100 for retrieving and/or returning purchased items. In this use case, those customers are positioned in close proximity to system 100, as shown in FIG. 5C. Each of them must enter or otherwise provide an authentication code, key, and/or other piece(s) of data to gain entry to locked locker(s) in the array. That act also enables a determination of the customers' identities. Having these determined customer identities enables the locker central control unit to cause one or more marketing messages that are targeted to the customers presently using the system 100 to retrieve and/or return purchased items to be displayed on one or more of the electronic displays, by the projector(s), and/or on header(s) 142 of system 100. In the example illustrated in FIG. 5C, locker central control unit causes three marketing messages to be displayed on electronic displays of the first 508, second 510, third 512 and fourth 514 quadrants of the customer-facing exterior facing surfaces of locker doors of the locker array.

In the case shown in FIG. 5C, a female customer entered her information to gain access to at least one of the lockers of the system 100 array, and is thereby identified. Based on one or more of her known and/or inferred customer attributes stored in memory device(s) (e.g., her last purchase was a pair of shoes), the marketing message(s) caused to be displayed in the fourth 514 quadrant is/are targeted to her and displayed at or near her eye-level, so as to grab her attention as she uses system 100. A male customer also entered his information to gain access to locker(s) of system 100 array, and is thereby identified. Based on one or more of his known and/or inferred customer attributes stored in memory device(s) (e.g., his last purchase was a citronella candle), the marketing message(s) caused to be displayed in the third 512 quadrant is/are targeted to him and displayed at or near his eye-level, so as to grab his attention as he uses system 100. Meanwhile, as shown in FIG. 5C, additional marketing messages of more general applicability to a broader swath of actual or potential customers are caused by locker central control unit to be concurrently displayed on the header 142, and additionally on synchronized electronic displays of the first 508 and second 510 quadrants.

Figure 5D:
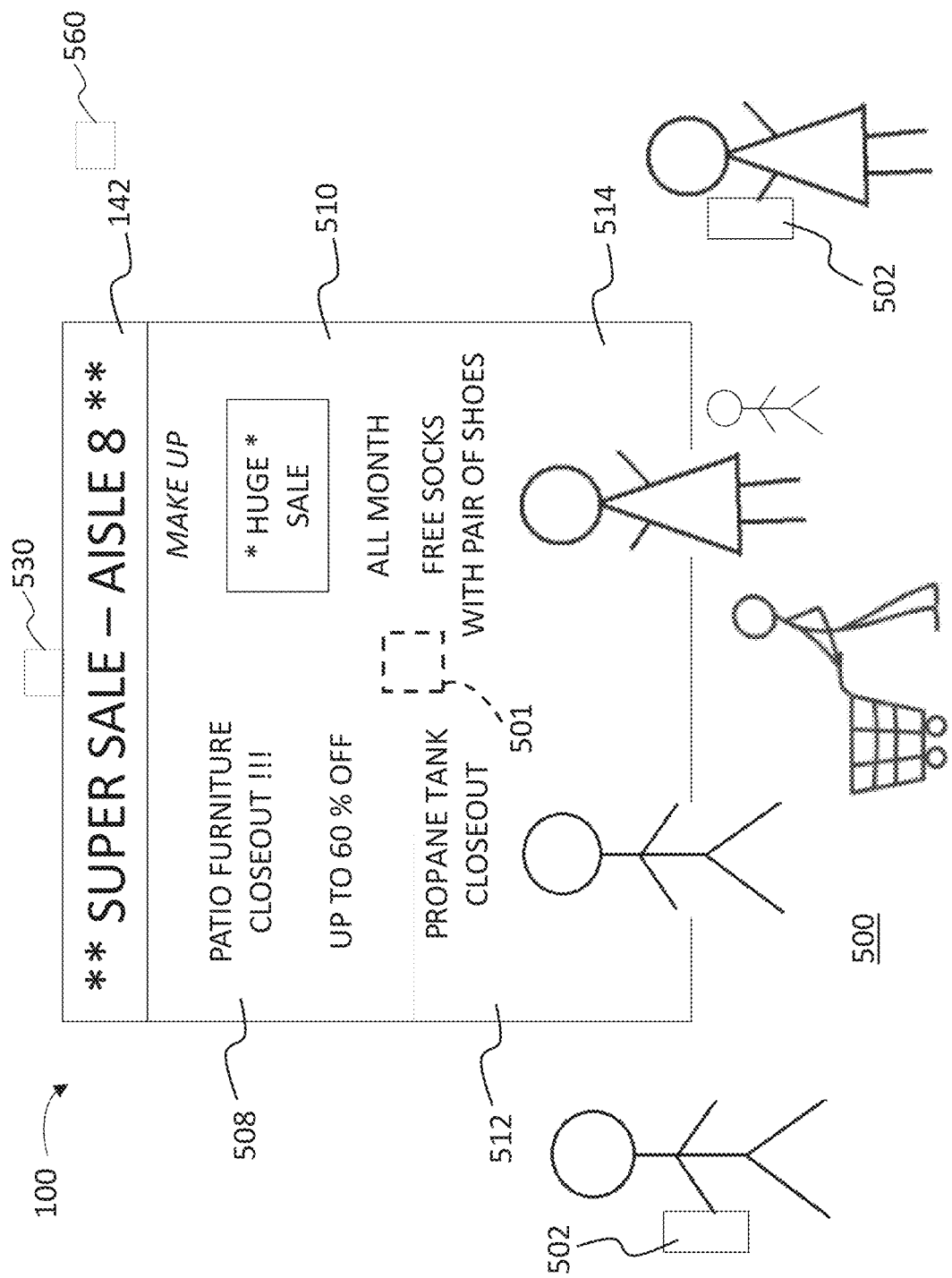

In FIG. 5D, at least one of the actual or potential customers in retail environment 500 proximal system 100 have smartphones running the app associated with the retail store having system 100. Additionally, at least one of the customers in FIG. 5D are utilizing system 100 for retrieving and/or returning purchased items. In this use case, transceiver 501 receives Bluetooth and/or other signals from smartphone(s) running the app which may be decoded and further processed to determine the identities of those respective customers. Having these determined customer identities enables the locker central control unit to cause one or more marketing messages that are targeted to those customers to be displayed on one or more of the electronic displays, by projector(s), and/or on header 142 of system 100. In the example illustrated in FIG. 5D, locker central control unit causes four marketing messages to be displayed on electronic displays of the first 508, second 510, third 512 and fourth 514 quadrants of the customer- and exterior-facing surfaces of locker doors of the locker array.

In the case shown in FIG. 5D, a female customer with the store app running on her smartphone is identified and, based on one or more of her known and/or inferred customer attributes stored in memory device(s) (e.g., her last purchase was a pair of shoes), the marketing message(s) caused to be displayed in the second 510 quadrant is targeted to her, so as to grab her attention as she passes by system 100, and regardless of whether or not she has a need to utilize system 100 lockers for retrieving and/or returning purchased items. A male customer with the store app running on his smartphone is also shown in FIG. 5D. He is identified and, based on one or more of his known and/or inferred customer attributes stored in memory device(s) (e.g., his last purchase was an outdoor fish smoker kit), the marketing message(s) caused to be displayed in the first 508 quadrant are targeted to him, so as to grab his attention as he passes by system 100, and regardless of whether or not he has a need to utilize system 100 lockers for retrieving and/or returning purchased items.

Additionally, in the case shown in FIG. 5D, another female customer entered her information to gain access to at least one of the lockers of the system 100 array, and is thereby identified. Based on one or more of her known and/or inferred customer attributes stored in memory device(s) (e.g., her last purchase was a pair of shoes), the marketing message(s) caused to be displayed in the fourth 514 quadrant is/are targeted to her and displayed at or near her eye-level, so as to grab her attention as she uses system 100. Another male customer also entered his information to gain access to locker(s) of system 100 array, and is thereby identified. Based on one or more of his known and/or inferred customer attributes stored in memory device(s) (e.g., his last purchase was an outdoor gas grill), the marketing message(s) caused to be displayed in the third 512 quadrant is/are targeted to him and displayed at or near his eye-level, so as to grab his attention as he uses system 100. Meanwhile, as shown in FIG. 5D, additional marketing message(s) of more general applicability to a broader swath of actual or potential customers are caused by locker central control unit to be concurrently displayed on the header 142, and additionally on electronic displays of the first 508 and second 510 quadrants.

The use cases shown and described above with reference to FIGS. 5A-5D, for instance, along with others that, although not disclosed in detail herein, may nevertheless be appreciable to persons having ordinary skill in the art, are readily achievable for the benefit of both owners and/or operators of system 100, as well as their actual or potential customers.

Figure 6:
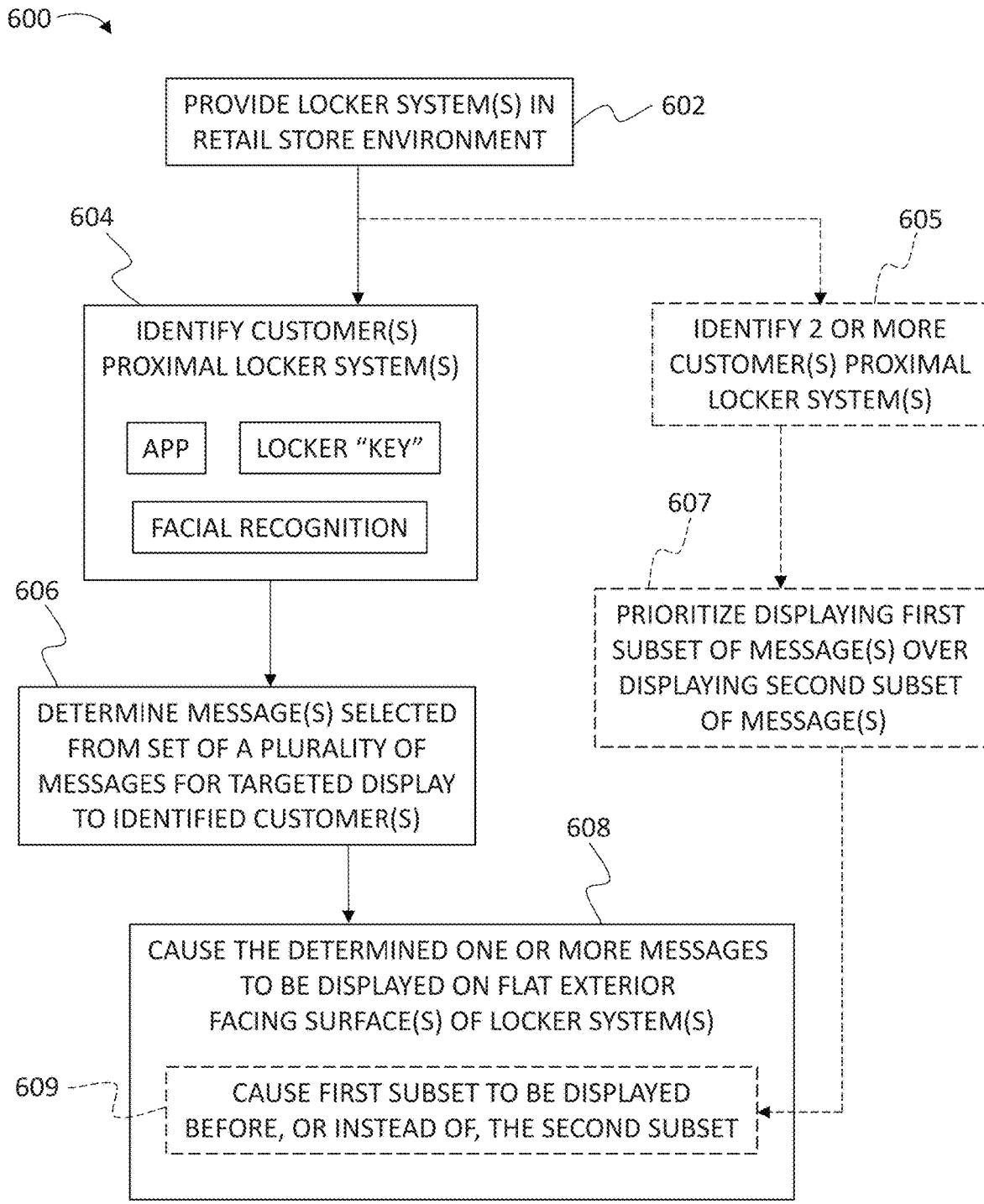
FIG. 6 is a flow chart of a method for providing visual marketing content to actual or potential customers in a retail store environment using, for example, the disclosed locker system.

FIG. 6 illustrates, in the form of a process flow chart, a method (e.g., computer-implemented method 600) for providing visual marketing content to actual or potential customers in a retail store environment using, for example, the disclosed locker system 100. The various steps of method 600 described below with reference to FIG. 6 may be implemented, performed, and/or otherwise facilitated by software which directs and/or mediates associated operations and/or computations of one or more processors of locker central control unit, order management system, and/or server(s) 560. Method 600 may utilize either a centralized or distributed computing, network communication, and/or software architecture for accomplishing the numerous beneficial ends of the disclosed systems, in practice. In one embodiment, at least one memory device of, or in communication with, the processor(s) include non-transitory computer-readable media having stored therein program instructions in the form of software and/or firmware. In such embodiments, the processor(s) execute at least some of the program instructions to perform at least some of the steps of method 600 as disclosed herein to implement the various beneficial functionality of the disclosed locker system 100.

Method 600 includes the step of providing 602 at least one locker system 100 in the retail environment 500. In one embodiment, the at least one locker system 100 includes an array of lockers, each locker of the array including a door having a flat exterior facing surface, where all flat exterior facing surfaces of all lockers of the array are co-planar in their closed positions. The at least one locker system 100 includes at least one locker central control unit in communication with one or more memory devices (e.g., of the server 560, order management system, and/or system 100). The at least one locker system 100 includes one or more electronic devices in communication with the locker central control unit(s), order management system(s), and/or server(s) 560 for displaying the visual marketing content on one or more of the flat exterior surfaces. In one embodiment, the one or more electronic devices include at least one electronic display screen. In another embodiment, the one or more electronic devices include at least one projector 160. In yet another embodiment, the one or more electronic devices include at least one electronic display screen and at least one projector 160. In still other embodiments, the one or more electronic devices include such other analog and/or digital hardware and/or software components and/or subsystems as may be recognized and appreciated to persons having ordinary skill in the art as being capable of effectively displaying the visual marketing content on one or more of the flat exterior surfaces.

Method 600 includes the step of identifying 604 one or more of the actual or potential customers proximal the locker system 100. In one embodiment, the locker central control unit of system 100 causes data that is representative of an identity of one or more of the actual or potential customers to be processed by processor(s) of the server 560 and/or the locker central control unit to determine customer's identities. In one example, signals received via transceiver 501 from environment 500 from mobile device(s) 502 of customers may be decoded by locker central control unit for purposes of determining identities of customers carrying mobile devices 502 proximal system 100 and/or within range of transceiver 501. In this example, the locker central control unit may cause the decoded signals to be transmitted, using transceiver 501, to the order management system and/or to the server(s) 560 for additional processing for determining the customers' identities. Data resulting from such additional processing is then received by locker central control system via transceiver 501 for further beneficial use in the disclosed systems and methods.

In another example, the at least one imaging device of system 100 generates image data of a scene of environment 500 proximal system 100. The generated image data may be directly transmitted, using transceiver 501, to server(s) 560 and/or order management system to be used for determining customer identities by one or more facial recognition algorithms being provided, for instance, as cloud SAAS. Additionally, or instead, this facial recognition functionality for identifying 604 customers may be performed, at least in part, by the locker central control unit.

In yet another example, the identities of customers engaging directly with system 100 to retrieve and/or return purchased items are determined based on authentication "keys" they use to obtain access to locker(s) of the array. As described above, the order management system associates items in the locker(s) with the authentication key and thus also with the identity of the respective customer(s). In such cases, system 100 may include a printer in communication with locker central control unit. Responsive to the determined identity of a respective customer who entered the "key" to unlock one or more locker(s) of the array, the locker central control unit may cause one or more paper coupons to be printed, where the coupons are targeted to the respectively identified 604 customer based on one or more their customer attributes. In some embodiments, upon identifying 604 a customer using any of the aforementioned techniques in method 600, server(s) 560, order management system(s), and/or locker central control unit may cause data to be transmitted to mobile device(s) 502 of customers, where the data may be further processed by server(s) (e.g., server 560) associated with the app to result in one or more coupons being available for use by the identified 604 customer(s) via their app and their mobile device(s) 502.

Identifying 604 customers using the aforementioned techniques, and others that are appreciable to persons having ordinary skill in the art, thus enables system 100 to deliver targeted marketing messages and such other audio/visual content to individuals or groups of customers in view of the system 100.

Method 600 includes the step of determining 606 one or more messages selected from a set of a plurality of messages stored in the one or more memory devices for targeted display to the one or more of the actual or potential customers. Each message of the set of the plurality of messages includes the visual marketing content. Audio content may also be included in one or more messages of the set. In cases where a customer in the vicinity of system 100 has been identified 604 in method 600, the determining step 606 may include determining one or more messages selected from a set of a plurality of messages pre-stored in memory (e.g., of system 100 and/or server(s) 506) for targeted display to the identified 604 one or more actual or potential customers.

Method 600 includes the step of causing 608 the determined 606 one or messages to be displayed on the one or more of the flat exterior surfaces using the one or more electronic devices. In cases where a customer in the vicinity of system 100 has been identified 604 in method 600, the causing step 608 may include causing the selected targeted content to be displayed to the identified 604 one or more of the actual or potential customers. In one embodiment, using techniques such as signal triangulation, signal strength comparison, signal timing, and the like, method 600 may determine at which side of, or orientation relative to, system 100 a targeted customer is present, and cause the marketing message(s) to be displayed to him or her in a manner maximizing their visibility to the respectively targeted customer. For example, and without limitation, for a targeted customer determined to be present on a left side of system 100, method 600 employs locker central control unit to display marketing message(s) to him or her using primarily electronic display devices on the left side of system 100. Similarly, facial recognition algorithms utilized in method 600 may determine positioning of identified 604 customers, and locker central control unit may advantageously utilize such positional data for causing marketing messaging content to be more impactfully displayed to targeted customer(s).

In one embodiment, the identifying step 604 of method 600 includes identifying 605 two or more actual or potential customers proximal the locker system. In this embodiment, method 600 may further include prioritizing 607 displaying a first subset of one or more messages targeted to a first of a plurality of actual or potential customers proximal locker system 100 over displaying at least a second subset of one or more messages targeted to at least a second of the plurality of actual or potential customers proximal locker system 100. In an example, the prioritizing 607 is based on a ranking of at least one known attribute as between the first, and the at least a second, actual or potential customers. Also, in this embodiment, the causing 608 step of method 600 includes causing 609 the first subset of one or messages to be displayed before, or instead of, causing the at least a second subset of one or more messages to be displayed.

For instance, a first of at least two identified 604 customers proximal system 100 has an order or purchase history that, within the last month, totals $5,679. In the example, an order or purchase history of a second identified 604 customer totals $12 over the last month. In the example, method 600, e.g., as implemented by processor(s) and memory of server(s) 560, order management system(s), and/or locker central control unit(s), ranks the first identified 604 customer higher than the second identified 604 customer with respect to the monetary value of their order or purchase histories, and prioritizes 607 delivery of targeted marketing messaging content accordingly. For example, a larger area of electronic display screens (e.g., a top two-thirds of all door exterior facing surface area of system 100) may be dedicated to deliver messaging targeted to the first identified 604 customer as compared to messaging targeted to the second identified 604 customer. Alternatively, or instead, in such cases, the prioritized 607 first identified 604 customer may have all available display surface area of system 100 dedicated to messaging targeted to him or her, while the second, lower ranked, identified 604 customer receives no targeted message content at all. Similarly, promotional messaging for items that have higher prices may be displayed over items for sale at lower prices may be prioritized 607 in such cases.

In another embodiment, system 100 enables targeted messaging to be delivered to customers directly interacting with system 100 for purposes of returning purchased items. For example, a store customer may complete a return transaction online at a website associated with the retail store for a previously purchased item. This situation is essentially the reverse case for the ship-to-store model, and enables the customer to avoid having to pack and ship an item. This use case benefits the store and its customers in a number of ways. The customers may avoid having to pay for return shipping and do not need to devote time to packing items for shipping. Meanwhile, the store providing the locker system 100 for item returns enjoys yet another avenue to drive customer traffic to their brick-and-mortar locations. Locker central control unit and order management system provides the authentication key to the customer in like manner as for the ship-to-store model, and the customer is thus similarly identified 604 in method 600. Otherwise, with the return use case, the retailer may utilize system 100 and method 600 for equivalently advantageous purposes as described above with reference to the ship-to-store model.

The integration of structural and functional components of system 100 and associated computing, communication, and memory resources enables prompt delivery of such targeted content for viewing by identified 604 customers proximal system 100 in environment 500 in relevant time periods, and regardless of whether or not they are utilizing system 100 for retrieving and/or returning items. Furthermore, even in cases where customers in the vicinity of system 100 may not be identified 604 in method 600, system 100 nevertheless provides a valuable tool for delivering marketing and other informational messaging in a visually pleasing, and space- and resource-efficient manner.

Various embodiments disclosed herein are to be taken in the illustrative and explanatory sense, and should in no way be construed as limiting of the present disclosure. While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A system for delivering purchased items to a select customer within a retail store environment having an order management system, said system comprising:
   a. an array of lockers with each locker having a door, and each of said doors having a flat front surface with all front surfaces being co-planar;
   b. a locking portion associated with each of said doors adapted to allow the door to open when in the unlocked state and remain closed when in the locked state; and
   c. a locker central control unit configured to control the locking portions on the array of lockers and comprising a data input portion for receiving information from the order management system on the select customer and command one or more select locking portions to alternately change from a locked to an unlocked state to allow a respective one or more doors to open and one or more items placed in a respective one or more lockers to be retrieved,
   wherein at least two of said door front surfaces include at least two electronic display screens coupled thereto, the at least two electronic display screens adapted to display a message to shoppers in the retail store environment that is synchronized between the at least two display screens to create a single larger image;
   wherein the select customer is provided an authentication code by the order management system, and wherein, upon presenting the authentication code to the locker central control unit, the locking portion for the select locker changes state and the door opens;
   wherein the electronic display on the select locker displays a message to the select customer that includes flashing a communication to the select customer that is associated with the one or more select lockers for retrieving the one or more item or items with the flashing communication independent of the message to shoppers in the retail store environment that is synchronized between the at least two display screens to create a single larger image.

2. The system of claim 1, further comprising a header positioned above the array of lockers and adapted to display a message to shoppers in the retail store environment.

3. The system of claim 2, wherein the messages on the at least two screens and the header are all synchronized to create a single larger image.

4. The system of claim 1, wherein the order management system controls the content of the synchronized message on the at least two electronic display screens.

5. The system of claim 4, wherein, responsive to the select customer presenting an authentication code to the locker central control unit, the order management system provides a message of pre-determined content to the at least two electronic display screens that is synchronized between the at least two display screens to create a single larger image.

6. The system of claim 5, wherein the message of pre-determined content is associated with an attribute of the select customer.

7. The system of claim 5, wherein the message of pre-determined content is associated with an attribute of the product purchased.

8. The system of claim 7, wherein the attribute of the product purchased is the store department in which the product is located.

9. The system of claim 1, further comprising a transceiver in communication with the locker central control unit and configured to receive a signal from a mobile computing device running an application associated with the retail store, wherein the locker central control unit is further configured to:
   decode the signal received from the mobile computing device; and
   cause the decoded signal to be processed to determine an identity of a user of the application.

10. The system of claim 9, wherein the locker central control unit is further configured to:
    responsive to the determined identity of the user of the application, cause one or more messages selected from a set of a plurality of messages to be displayed on the at least two electronic display screens that are synchronized between the at least two display screens to create a single larger image.

11. The system of claim 9, wherein, to cause the decoded signal to be processed to determine the identity of the user of the application, the locker central control unit is further configured to:

transmit, using the transceiver, the decoded signal to the order management system; and receive, via the transceiver, data representative of the identity of the user of the application from the order management system.

12. The system of claim 10, wherein, to cause the one or more synchronized messages to be displayed on the at least two electronic display screens, the locker central control unit is further configured to:

receive, via the transceiver, the one or more messages from the order management system; and cause the one or more messages received from the order management system to be displayed on the at least two electronic display screens.

13. The system of claim 1, further comprising at least one imaging device in communication with the locker central control unit, the at least one imaging device configured to generate image data of a scene proximal said system, the locker control unit further configured to cause the generated image data to be processed to identify, using one or more facial recognition algorithms, one or more people present in the scene.

14. The system of claim 13, wherein the locker central control unit is further configured to:

responsive to determined identities of the one or more people, cause one or more messages selected from a set of a plurality of messages to be displayed on the at least two electronic display screens that is synchronized between the at least two display screens to create a single larger image, wherein the one or more synchronized messages are targeted to the identified one or more people.

* * * * *